US012606276B2

(12) United States Patent (10) Patent No.: US 12,606,276 B2
Skaare (45) Date of Patent: Apr. 21, 2026

(54) MOORING SYSTEM FOR FLOATING WIND TURBINE

(71) Applicant: EQUINOR ENERGY AS, Stavanger (NO)

(72) Inventor: Bjørn Skaare, Trondheim (NO)

(73) Assignee: EQUINOR ENERGY AS, Stavanger (NO)

( * ) Notice: Subject to any disclaimer, the term of this patent is extended or adjusted under 35 U.S.C. 154(b) by 597 days.

(21) Appl. No.: 18/006,173

(22) PCT Filed: Jul. 22, 2021

(86) PCT No.: PCT/NO2021/050172
§ 371 (c)(1),
(2) Date: Jan. 20, 2023

(87) PCT Pub. No.: WO2022/031175
PCT Pub. Date: Feb. 10, 2022

(65) Prior Publication Data
US 2023/0257075 A1 Aug. 17, 2023

(30) Foreign Application Priority Data

Aug. 4, 2020 (GB) ...................................... 2012075

(51) Int. Cl.
*B63B 21/50* (2006.01)
*B63B 21/20* (2006.01)
(Continued)

(52) U.S. Cl.
CPC .............. *B63B 21/50* (2013.01); *B63B 21/20* (2013.01); *F03D 13/25* (2016.05); *B63B 2035/446* (2013.01); *F05B 2240/93* (2013.01)

(58) Field of Classification Search
CPC ... B63B 21/50; B63B 21/20; B63B 2035/446; B63B 35/44; F03D 13/25; F03D 80/00;
(Continued)

(56) References Cited

U.S. PATENT DOCUMENTS 6,273,018 B1 * 8/2001 Gottsche ............. B63B 35/4413
114/264
8,689,881 B2 * 4/2014 Nadarajah ............... B63B 35/44
166/344
2018/0051677 A1 2/2018 Aubault et al.

FOREIGN PATENT DOCUMENTS

CA 3 079 791 A1 5/2019
EP 2789848 A1 10/2014
(Continued)

OTHER PUBLICATIONS

Extended Search Report, EP 21853383.4, dated Sep. 4, 2024 (11 pp.).

(Continued)

*Primary Examiner* — Anthony D Wiest
(74) *Attorney, Agent, or Firm* — Eversheds Sutherland (US) LLP

(57) ABSTRACT

A wind turbine system including a rotationally asymmetric floating wind turbine installation and a rotationally asymmetric mooring system connected to the floating wind turbine installation. The mooring system includes a number of mooring lines connected, directly or indirectly, to the floating wind turbine installation such that the mooring system has a lower yaw stiffness when a wind acting on the wind turbine installation comes from 0° than when a wind acting on the wind turbine installation comes from ±90°. A wind coming from 0° is defined as a wind direction when the horizontal part of the aerodynamic rotor thrust force result-
(Continued)

ing from the wind is directed towards the center of gravity
of the floating wind turbine installation.

16 Claims, 7 Drawing Sheets

(51) Int. Cl.
   *B63B 35/44*               (2006.01)
   *F03D 13/25*               (2016.01)
(58) Field of Classification Search
   CPC .............. F05B 2240/93; F05B 2240/95; F05B
                           2240/97; Y02E 10/72; Y02E 10/727
   See application file for complete search history.

(56)                    References Cited

FOREIGN PATENT DOCUMENTS

| | | | |
|---|---|---|---|
| EP | 2789849 | A1 | 10/2014 |
| WO | 2006/121337 | A1 | 11/2006 |
| WO | 2009064737 | A1 | 5/2009 |
| WO | 2009/131826 | A2 | 10/2009 |
| WO | 2013/040871 | A1 | 3/2013 |

OTHER PUBLICATIONS

International Search Report and Written Opinion, PCT/NO2021/
050172, dated Sep. 22, 2021 (10 pp.).
Search Report, GB2012075.4, dated Jan. 13, 2021 (5 pp.).

\* cited by examiner

MOORING SYSTEM FOR FLOATING WIND TURBINE

TECHNICAL FIELD

The present invention relates to the field of floating wind turbines. In particular, it relates to a mooring system for a floating wind turbine installation.

BACKGROUND OF THE INVENTION

FIG. 1 is a schematic plan of a rotationally asymmetric semi-submersible floating wind turbine installation 1 with a known mooring system. The wind turbine installation 1 comprises a floater with three columns: two empty columns 2 and a third column 3 supporting the wind turbine itself. The three columns 2, 3 are joined in a triangle by three connecting members 4 to form the floater. The wind turbine installation 1 is moored with a mooring system comprising three mooring lines 5. One mooring line 5 is connected directly to each column 2, 3, in an arrangement which is rotationally symmetric about the centre of the wind turbine installation 1, as can be seen in FIG. 1.

The mooring system of FIG. 1 will usually be dynamically stable in roll-yaw. However, the motion characteristics are considered to be unfavourable with relatively large roll and yaw motions. This will particularly be the case when the wind is directed along the positive or negative direction of the y-axis indicated in FIG. 1, which will lead to a large static offset, as well as significant dynamic roll and yaw motions.

FIG. 2 is a schematic plan of the rotationally asymmetric semi-submersible floating wind turbine installation 1 with a further known mooring system. As in the mooring system of FIG. 1, the mooring system of FIG. 2 also comprises three mooring lines 5'. However, the mooring lines 5' are not connected directly to the columns 2, 3, of the wind turbine installation. Instead, each mooring line 5' is connected to a bridle 6, which itself is connected to the wind turbine installation 1. Each bridle 6 comprises two bridle lines 6a. Each bridle line 6a is connected to a column 2, 3 of the wind turbine installation. As such, there are two bridle lines 6a (from adjacent bridles 6) connected to each column 2, 3, as shown in FIG. 2. As in the mooring system of FIG. 1, the mooring system of FIG. 2 (i.e. the mooring lines 5' and bridles 6) is arranged rotationally symmetrically about the centre of the wind turbine installation 1, as can be seen in FIG. 2.

Compared with the mooring system of FIG. 1, in the mooring system of FIG. 2 the yaw stiffness is increased significantly due to the presence of the bridles 6. This is because the resistance force from the mooring system of FIG. 2 is taken up at the horizontal radius of the connection point of the bridles 6 to the mooring lines 5', instead of at the radius of the wind turbine installation 1.

The rotationally symmetric mooring system of FIG. 2 provides favourable motion characteristics compared with the single line mooring system of FIG. 1 for most wind directions. However, when the wind is propagating in the negative x-direction, as shown in FIG. 2, this can result in a dynamically unstable floating wind turbine installation.

SUMMARY OF THE INVENTION

According for a first aspect of the invention, there is provided a wind turbine system comprising a rotationally asymmetric floating wind turbine installation and a rotationally asymmetric mooring system connected to the floating wind turbine installation, wherein the mooring system comprises a plurality of mooring lines connected, directly or indirectly, to the floating wind turbine installation such that the mooring system has a lower yaw stiffness when a wind acting on the wind turbine installation comes from 0° than when a wind acting on the wind turbine installation comes from ±90° (or, equivalently, 90° or 270°), wherein a wind coming from 0° is defined as a wind direction when the horizontal part of the aerodynamic rotor thrust force resulting from the wind is directed towards the centre of gravity of the floating wind turbine installation.

The reference to each of a floating wind turbine installation and a mooring system being rotationally asymmetric means rotationally asymmetric about a vertical axis (e.g. through a central point of the floating wind turbine installation or mooring system, respectively).

A rotationally asymmetric floating wind turbine installation may comprise a floating support structure (or floater) with a rotor supported at an upper end of a column or tower extending up from the (rest of the) floating support structure. The column or tower supporting the rotor may be located at a non-central location of the floating wind turbine installation (e.g. when viewed from above/in a horizontal plane) such that the wind turbine installation is rotationally asymmetric about a vertical axis. The floating support structure may comprise a number of columns (e.g. three) connected by connecting members (e.g. in a triangle). The connecting members may all be the same length.

The mooring system comprises a plurality of mooring lines connected, directly or indirectly, to the floating wind turbine installation. The mooring system is preferably arranged to moor the floating wind turbine installation in a substantially stable position. For example, an end of each mooring line furthest from the floating wind turbine installation may be connected or anchored to a seabed (or a bed of another body of water in which the floating wind turbine installation is located). The mooring system may allow some small movements of the floating wind turbine installation, e.g. due to wind, currents or waves, for example.

As the mooring system is rotationally asymmetric, it can be (and preferably is) arranged such that the mooring system has a lower yaw stiffness when a wind acting on the wind turbine installation comes from 0° than when a wind acting on the wind turbine installation comes from ±90° (or, equivalently, 90° and 270°).

A wind coming from 0° is defined as the wind direction when the horizontal part of the aerodynamic rotor thrust force resulting from that wind is directed towards the centre of gravity of the floating wind turbine installation.

As the mooring system has a lower yaw stiffness when a wind acting on the wind turbine installation comes from 0° (as defined above) than when a wind comes from ±90°, this means that the mooring system has a lower yaw stiffness when roll-yaw instability may be a risk, and a greater yaw stiffness when roll-yaw instability is not a risk, thereby providing a more stable system. The reasons for this are explained in more detail below.

The actual yaw stiffness of the mooring system may depend on various parameters, which may vary depending on the particular embodiment, such as the type of floater used in the wind turbine installation, the water depth, the type of mooring line, its pre-tension and the aerodynamic thrust force, for example. However, in some embodiments, the yaw stiffness of the mooring system may be around 40-60% greater when a wind acting on the wind turbine installation comes from 0° than when a wind acting on the wind turbine installation comes from 90° or 270°. For example, the mooring system may have a yaw stiffness of around 4000-5000 kNm/deg when a wind acting on the wind turbine installation comes from 0°, and a yaw stiffness of around 6000-7000 kNm/deg when a wind acting on the wind turbine installation comes from 90° or 270°.

The mooring system may comprise at least one first mooring line and at least one second mooring line, with each of the at least one first and second mooring lines having a wind turbine installation connection end for connection (or connected), directly or indirectly, to the floating wind turbine installation. In other words, the wind turbine installation connection end of a mooring line is the end of a mooring line which is located closest to the wind turbine installation although it may not necessarily be connected to the wind turbine installation directly (it may be connected to the wind turbine installation indirectly).

The wind turbine installation connection end of the at least one first mooring line may be arranged at a location closer to the rotor than the wind turbine installation connection end of the at least one second mooring line. In some cases, two such first mooring lines are provided. In some cases, a single such second mooring line is provided.

Preferably, the wind turbine installation connection end of the at least one second mooring line is located further, i.e. at a greater distance, from the floating wind turbine installation than the wind turbine installation connection end of the at least one first mooring line. In other words, the distance between the wind turbine installation connection end of the at least one second mooring line and the floating wind turbine installation is preferably greater than the distance between the wind turbine installation connection end of the at least one first mooring line and the floating wind turbine installation.

The distance between a wind turbine installation connection end of a mooring line and the floating wind turbine installation should be understood as the distance between the wind turbine connection end of the mooring line and the point of direct or indirect connection of the mooring line to the floating wind turbine installation. For example, if the wind turbine connection end of a mooring line is connected (e.g. via a connector or fixing means) directly to the floating wind turbine installation then there may be no or negligible distance between the wind turbine installation connection end of the mooring line and the floating wind turbine installation. However, if the wind turbine connection end of a mooring line is connected indirectly to the floating wind turbine installation, for example via a bridle, then there may be a distance between the wind turbine installation connection end of the mooring line and its point of connection to the floating wind turbine installation that is greater than zero.

By locating the wind turbine installation connection end of the at least one second mooring line further from the floating wind turbine installation than the wind turbine installation connection end of the at least one first mooring line (e.g. where the wind turbine installation connection end of the at least one first mooring line is arranged at a location closer to the rotor than the wind turbine installation connection end of the at least one second mooring line), this can provide a mooring installation which has a lower yaw stiffness when a wind acting on the wind turbine installation comes from 0° than when a wind is coming from ±90°.

For example, the wind turbine installation connection end of the at least one second mooring line may be located 2 to 6, or around 4, times further from the floating wind turbine installation than the wind turbine installation connection end of the at least one first mooring line. In one embodiment, the wind turbine installation connection end of the at least one second mooring line is located around 150 to 250 m (e.g. around 200 m) from the floating wind turbine installation, and the wind turbine installation connection end of the at least one first mooring line is located around 40 to 60 (e.g. around 50 m) from the floating wind turbine installation.

In some embodiments, the wind turbine installation connection end of the at least one second mooring line is located at a distance from the wind turbine installation, e.g. around 150 to 250 m (e.g. around 200 m) from the wind turbine installation. However, the wind turbine installation connection end of the at least one first mooring line may be connected (e.g. via a connector) directly to the wind turbine installation such that there may be no or a negligible distance between the wind turbine installation connection end of the at least one first mooring line and the wind turbine installation. Thus, the wind turbine installation connection end of the at least one first mooring line may located between 0 and 100 m from the floating wind turbine installation The wind turbine installation connection end of the at least one second mooring line may be located further from the floating wind turbine installation than the wind turbine installation connection end of the at least one first mooring line by connecting the at least one second mooring line to the floating wind turbine installation with or via a bridle(s), for example.

A bridle is a means for distancing a wind turbine connection end of a mooring line from the wind turbine installation. Preferably, the bridle connects to the mooring line at its wind turbine connection end (e.g. at a single point) and connects to the wind turbine installation at two or more different (spaced-apart) points or over a connection range).

A bridle may comprise two or more bridle lines, each of which are connected at first ends thereof, to one end (a wind turbine installation connection end) of a mooring line, with the two or more bridle lines being connected (or connectable) at their second ends to the wind turbine installation at two or more different (spaced-apart) connection points.

A bridle may be said to have a bridle radius corresponding to the distance between the point at which the bridle (e.g. its bridle lines) is (are) connected to the mooring line (e.g. at the wind turbine connection end of the mooring line) and a centre point (e.g. the gravitational centre) of the floating wind turbine installation in the plane of the bridles or mooring line.

In some cases, the at least one first mooring line may (also) be connected to the floating wind turbine installation with or via a bridle(s). In such cases, the bridle(s) connected to the at least one second mooring line may be longer than (or have a bridle radius which is longer than that of) the bridle(s) connected to the at least one first mooring line. For example, the bridle(s) connected to the at least one second mooring line may be around two to four times longer than the bridle(s) connected to the at least one first mooring line.

In a preferred embodiment, the bridle(s) connected to the at least one second mooring line have a bridle radius around three times longer than the bridle(s) connected to the at least one first mooring line. For example, the (longer) bridle(s) connected to the at least one second mooring line may have a bridle radius of around 100-500 m (e.g. around 237 m in some embodiments) whereas the (shorter) bridle(s) connected to the at least one first mooring line may have a bridle radius of around 50-250 m (e.g. around 79 m in some embodiments).

A bridle may be any connection means for connecting a mooring line to a wind turbine installation, wherein the bridle is arranged to connect to an end of the mooring line at a single point, and to the wind turbine installation at two or more different points.

A bridle may comprise two or more bridle lines for connecting an end of a mooring line to the floating wind turbine installation. In a preferred embodiment, each bridle comprise two bridle lines. Each bridle line of a particular bridle is preferably connected to the floating wind turbine installation at a different location. However, two (or more) bridle lines from two (or more) different bridles may be connected to the floating wind turbine installation at a same or common connection point.

In one example, a pair of bridle lines from a single bridle are connected to floating wind turbine installation at locations with a spacing of around 60 m. However, this distance may depend on the particular wind turbine installation, and more particularly its floater design.

The two or more bridle lines of a bridle connected to the at least one first mooring line may have a length of around 50 to 80 m, e.g. 64 m.

The two or more bridle lines of a bridle connected to the at least one second mooring line may have a length of around 200 to 230 m, e.g. 213 m.

Preferably, at least one mooring line (e.g. the at least one second mooring line as defined above) is connected to the floating wind turbine installation with a bridle.

Using one or more bridles (e.g. of different lengths, if more than one bridle is used) to attach one or more of the plurality of mooring lines to the floating wind turbine can provide a system with different yaw stiffnesses when loads (e.g. wind) act on the system from different directions. This can help to stabilise asymmetric floating wind turbine installations.

In some embodiments, at least two and optionally all of the plurality of mooring lines are connected to the floating wind turbine installation with bridles. This can help to provide a more stable wind turbine system in roll-yaw.

In systems where two or more mooring lines are connected to the floating wind turbine installation with bridles, the bridles may be and in some cases preferably are of at least two different lengths. This can provide different yaw stiffnesses when loads (e.g. wind) act on the system from different directions and can thereby help to stabilise the system. In such cases, preferably, a shorter bridle or bridles of the mooring system is/are connected to the wind turbine installation at a location or locations closer to the rotor than a longer bridle or bridles.

In some embodiments, the wind turbine installation may comprise a plurality of columns and at least one bridle may be arranged to connect at least one mooring line to one or more of the plurality of columns. In some cases, a bridle may connect a mooring line to two (or possible more than two) columns.

In some embodiments, at least one (e.g. one or two) mooring line(s) may be connected directly to a support structure or column of the floating wind turbine installation (e.g. without a bridle). A column to which at least one mooring line may be directly connected is preferably a column supporting a rotor of the wind turbine installation. For example, one or two mooring lines may be connected directly (e.g. without a bridle) to a column supporting a rotor of the wind turbine installation.

The mooring system may comprise three mooring lines, at least one of which may be attached to the wind turbine installation with a bridle. In some cases, just one (one and only one) mooring line may be attached to the wind turbine installation with a bridle (e.g. one or more further mooring lines may be attached directly to the wind turbine installation, e.g. without a bridle).

Where the mooring system comprises three mooring lines, first and second mooring lines of the three mooring lines may be arranged closer to the rotor than a third mooring line of the three mooring lines. The first and second mooring lines arranged closer to the rotor may be directly or indirectly (e.g. with or without bridles) connected to a column of the wind turbine installation supporting the rotor. However, the first and second mooring lines arranged closer to the rotor need not necessarily be connected to a column of the wind turbine installation supporting the rotor. For example, such first and/or second mooring lines may be connected to another part of a support structure of the wind turbine installation. In either case, the third mooring line (e.g. a mooring line further from the rotor) may be (and preferably is) attached to the wind turbine installation with a bridle. Wind turbine installation connection ends of the first and second mooring lines are preferably arranged closer to the wind turbine installation than a wind turbine installation connection end of the third mooring line (e.g. by use of a bridle, or a longer bridle, connecting the wind turbine connection end of the third mooring line to the wind turbine installation).

The bridle and mooring lines may be made of various materials including mooring chain, wire rope, polyester rope, etc. The bridle and mooring lines may be made of the same materials or different materials.

A mooring line may, for example, be formed of a plurality of segments, which may comprise different materials.

The bridle and mooring lines may have the same or different thicknesses.

The bridle lines may be connected to the mooring lines with a joint such as a vacuum-explosion welded transition joint, e.g. Triplate®.

The bridle and/or mooring lines may be connected to the floating wind turbine installation with a connector such as a fairlead.

According to a further aspect, there is provided a method of mooring a rotationally asymmetric wind turbine installation, the method comprising: providing a rotationally asymmetric mooring system comprising a plurality of mooring lines; and connecting the plurality of mooring lines, directly or indirectly, to the floating wind turbine installation such that the mooring system has a lower yaw stiffness when a wind acting on the wind turbine installation comes from 0° with respect to a rotor of the floating wind turbine installation than when a wind is coming from ±90°.

In such a method, the wind turbine installation and/or the mooring system may be as described herein, with any of their optional or preferred features. As such, the wind turbine installation and the mooring system may form a wind turbine system as described herein, with any of its optional or preferred features.

According to a further aspect, there is provided a wind turbine system comprising a rotationally asymmetric floating wind turbine installation and a rotationally asymmetric mooring system connected to the floating wind turbine installation, wherein:

the mooring system comprises at least one first mooring line and at least one second mooring line, each of the at least one first and second mooring lines having a wind turbine installation connection end for connection (or connected), directly or indirectly to the floating wind turbine installation;

the wind turbine installation connection end of the at least one first mooring line is arranged at a location closer to the rotor than the wind turbine installation connection end of the at least one second mooring line; and the wind turbine installation connection end of the at least one second mooring line is located further from the floating wind turbine installation than the wind turbine installation connection end of the at least one first mooring line.

The at least one second mooring line is preferably connected to the wind turbine installation with a bridle.

Embodiments of the invention (e.g. as described herein) may provide a mooring system with a lower yaw stiffness when $F_{thrust}$ (the aerodynamic rotor thrust force) is positive (relative to the orientation of the wind turbine installation 1 in FIGS. 3-5) and roll-yaw instability may be a risk. However, the yaw stiffness increases significantly when the wind is coming from ±90° (relative to the orientation of the wind turbine installation 1 in FIG. 3) when roll-yaw instability is not a risk. As such, a more stable wind turbine system may be provided.

In particular, embodiments of the invention comprise a rotationally asymmetric (about a vertical axis) mooring system with one or more bridles to achieve a high overall yaw stiffness without causing problems with roll-yaw instabilities. One or more shorter bridles (or no bridles) may be used in the most unstable environmental loading direction with respect to roll-yaw instability, while the longest bridle (s) (or a bridle) should be used in the most stable environmental loading direction with respect to roll-yaw instability.

The following mathematics demonstrates a roll-yaw instability issue for floating wind turbines and demonstrates why embodiments the invention as described herein can provide high yaw stiffness without encountering roll-yaw instability problems.

A spar type floating wind turbine installation 20 is considered in the following equations but the derivations will also apply to a different type of floater such as a semi-submersible.

As illustrated schematically in FIGS. 6 and 7, the spar type floating wind turbine installation 20 comprises a tower 21, a nacelle 22 and a rotor 23.

The net aerodynamic energy in and out of the system perpendicular to the wind direction can be calculated by considering a harmonic roll motion $\theta_{roll}$ oscillating at the roll natural frequency $\omega$:

$$\theta_{roll} = A_{roll} \sin(\omega t), \tag{1}$$

where $A_{roll}$ is the amplitude of the roll motion and t is the time.

Consider further a harmonic yaw motion $\theta_{yaw}$ oscillating at the same oscillation frequency $\omega$ with amplitude $A_{yaw}$ and phase angle $\phi_{yaw}$:

$$\theta_{yaw} = A_{yaw} \sin(\omega t - \phi_{yaw}) \tag{2}.$$

FIG. 6 is a schematic plan view of the floating wind turbine installation 20 illustrating how yaw motion of the floating wind turbine installation 20 can lead to excitation of a roll moment.

Referring to FIG. 6, the equation for the net aerodynamic energy perpendicular to the wind direction over one cycle of oscillation ($E_{aero,y}$) can be determined as:

$$E_{aero,y} = \int_0^{2\pi/\omega} -F_{thrust}\theta_{yaw}z_c\dot{\theta}_{roll}dt, \tag{3}$$

where $F_{thrust}$ is the aerodynamic rotor thrust force and $z_c$ is the effective arm for the roll motion at the nacelle level of the wind turbine installation 20.

Insertion of equations (1) and (2) in equation (3) gives:

$$E_{aero,y} = -F_{thrust}z_cA_{yaw}A_{roll}\omega \int_0^{2\pi/\omega} \sin(\omega t - \phi_{yaw})\cos(\omega t)dt = \tag{4}$$

$$F_{thrust}z_cA_{yaw}A_{roll}\pi\sin(\phi_{yaw}).$$

According to equation (4), the aerodynamic energy perpendicular to the wind direction will grow unless $\phi_{yaw}=0$ or $\phi_{yaw}=\pi$.

Referring again to FIG. 6, it can be seen that a yaw motion can lead to excitation of a roll moment. The roll moment can be expressed as:

$$M_{roll,yaw} = -F_{thrust}\theta_{yaw}z_{c1}, \tag{5}$$

where $M_{roll,yaw}$ is the roll excitation moment from a yaw motion and $z_{c1}$ is the effective moment arm for the y-component of the aerodynamic rotor thrust force ($F_{thrust}$).

FIG. 7 is a schematic plan view illustrating how inertia and gravity forces resulting from a roll motion of a floating wind turbine installation 20 can lead to excitation of a yaw moment.

Referring to FIG. 7, it can be seen that inertia and gravity forces resulting from roll motion of a floating wind turbine installation 20 can lead to excitation of a yaw moment due to the off tower-centre location of the centre of gravity of the nacelle 22. In addition, there is a contribution from the aerodynamic thrust force, $F_{thrust}$, combined with the roll motion. The inertia force will act in the opposite direction of the roll acceleration as indicated, while the gravitational and aerodynamic forces will give a component in the direction of the roll motion.

The yaw excitation moment from a roll motion becomes:

$$M_{yaw,roll} = -z_{c2}d_{CoG}m_N\ddot{\theta}_{roll} + d_{CoG}m_Ng\theta_{roll} + z_{c1}F_{thrust}\theta_{roll} \tag{6}$$

where $m_N$ is the mass of the nacelle 22, $\ddot{\theta}_{roll}$ is the roll acceleration, $z_{c2}$ is the effective moment arm from the centre of gravity of the nacelle 22 ($z_{c1}\cong z_{c2}$ for a spar), and $d_{CoG}$ is the horizontal distance of the centre of gravity of the nacelle 22 from the tower 21 centre.

Furthermore, harmonic roll motion with natural frequency $\omega$ can be assumed since the roll motion has little damping and excitation mechanisms are present with energy in this frequency range, particularly near the rated wind speed of the wind turbine installation 20.

For harmonic motion:

$$\ddot{\theta}_{roll} = -\omega^2\theta_{roll}, \tag{7}$$

and equation (7) inserted into equation (6) gives the yaw excitation moment $M_{yaw,roll}$ of the form:

$$M_{yaw,roll} = z_{c2}\omega^2d_{CoG}m_N\theta_{roll} + d_{CoG}m_Ng\theta_{roll} + z_{c1}F_{thrust}\theta_{roll}$$

$$M_{yaw,roll} = (d_{CoG}m_N(z_{c2}\omega^2+g)+z_{c1}F_{thrust})\theta_{roll}, \tag{8}$$

from which it is seen that the yaw excitation moment is in phase with the roll motion.

This implies that the phase angle between the roll motion and the yaw motion will be equal to the yaw motion phase angle, $\phi_{yaw}$. This is shown for a single degree of freedom system in FIG. 8, with $\phi=\phi_{yaw}$, $\omega$=natural frequency in roll, and $\omega_n$=natural frequency in yaw. FIG. 8 is a phase diagram of a single degree of freedom dynamic system and shows the phase angle between the dynamic response and the forced oscillation of a dynamic system as a function of the ratio between the excitation frequency and the natural frequency of the dynamic system, for different relative damping ratios, $\zeta$.

Taking the above implication in combination with equation (4) shows that the roll-yaw dynamics of a floating wind turbine will be unstable when the roll and yaw natural frequencies are too close to each other, depending on the yaw damping level present in the system. In other words, the yaw dynamics must be completely stiffness dominated or completely mass dominated in order to achieve a stable floating wind turbine in roll-yaw.

As explained above, equation (8) applies to a rotationally symmetric spar type floating wind turbine. In order to apply it to a rotationally asymmetric floater, the following factors should be taken into account:

1. The distance $d_{COG}$ will be the horizontal distance from the centre of gravity of the floater to the centre of gravity of the tower-rotor-nacelle assembly.
2. The mass $m_N$ will be the mass of the tower-rotor-nacelle assembly.
3. The $z_{c1}$ variable will be the effective moment arm to the vertical position of the centre of mass of the tower-rotor-nacelle assembly ($z_{c1} \neq z_{c2}$ for a rotationally asymmetric floating wind turbine).
4. The aerodynamic thrust force $F_{thrust}$ will come from difference directions. As an example, one can consider a positive or negative $F_{thrust}$:
   a. For a positive $F_{thrust}$, the gravity and inertia terms in equation (8) will contribute to de-stabilising the system to a larger extent than for a rotationally symmetric floating wind turbine. This is due to larger $d_{COG}$ and $m_N$.
   b. For a negative $F_{thrust}$, the gravity and inertia terms in equation (8) will contribute to stabilising the system, which is not the case for a rotationally symmetric floating wind turbine.

The mooring system of the present invention takes advantage of factor 4b, i.e. that for a negative $F_{thrust}$, the gravity and inertia terms in equation (8) will contribute to stabilising the system.

Since the yaw dynamics of rotationally asymmetric floaters will typically be mass dominated, the invention applies a significantly lower yaw stiffness when $F_{thrust}$ is positive compared to when $F_{thrust}$ is negative. This leads to an overall or average yaw stiffness that is significantly larger than what is possible with a rotationally symmetric layout without causing instability.

As described above, embodiments of the invention may provide different yaw stiffness by adjusting where mooring lines are connected to the floating wind turbine installation, e.g. by the use of a bridle for one mooring line, or bridles or different lengths for all mooring lines. Alternatively, different desired yaw stiffnesses may be provided by using mooring lines of different (inherent) stiffnesses. However, fatigue damage of mooring lines is strongly dependent on their pretension so it is preferred that the desired different stiffnesses are provided by adjusting where, e.g. by using bridles, at least some of the mooring lines are connected to the wind turbine installation.

BRIEF DESCRIPTION OF THE DRAWINGS

Preferred embodiments of the invention will now be described by way of example only and with reference to the accompanying drawings, in which.

DETAILED DESCRIPTION

Figure 3:
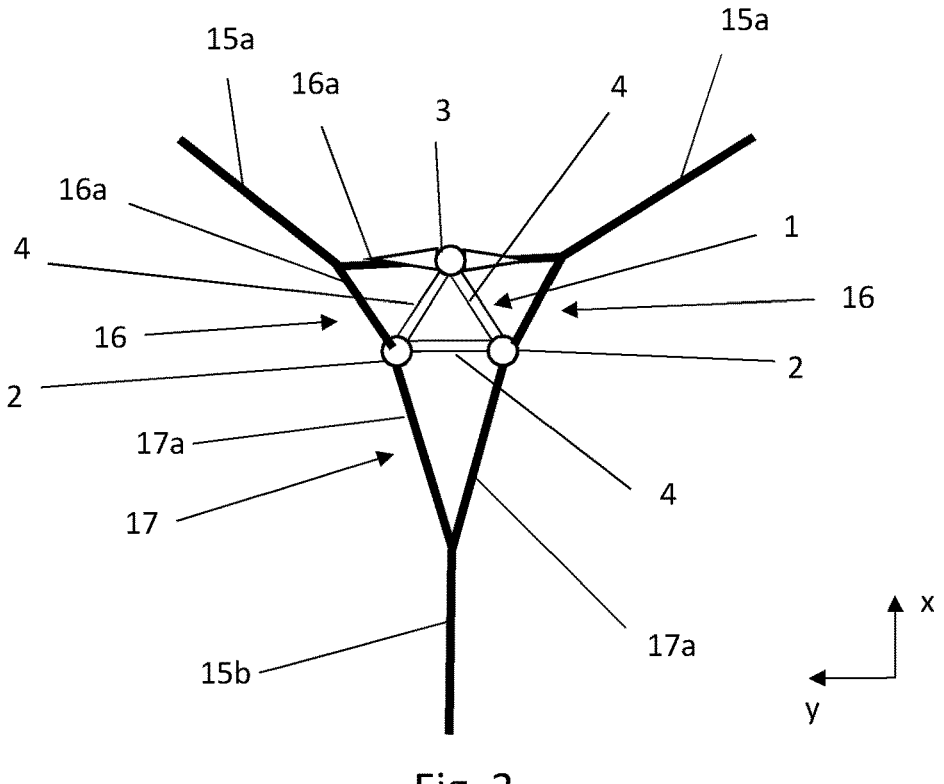
FIG. 3 is a schematic plan view of a floating wind turbine with a mooring system according to one embodiment.

FIG. 3 is a schematic plan view of a rotationally asymmetric semi-submersible floating wind turbine installation 1 with a mooring system according to a first embodiment.

As described above in relation to FIGS. 1 and 2, the rotationally asymmetric floating wind turbine installation 1 comprises a floater formed of three columns 2, 3 joined in a triangle by three connecting members 4. Two of the columns 2 are empty and the third column 3 supports the wind turbine itself.

In the embodiment of FIG. 3, the wind turbine installation 1 is held in position with a mooring system comprising three mooring lines 15a, 15b, and three bridles 16, 17.

Two of the mooring lines 15a are each connected to the wind turbine installation 1 (specifically to the floater of the wind turbine installation 1) via a bridle 16. Thus, the mooring system comprises two bridles 16 connected to the mooring lines 15a. Each bridle 16 comprises two bridle lines 16a. In each bridle 16, one bridle line 16a is connected to the column 3 supporting the wind turbine, and one bridle line 16a is connected to a (different) empty column 2, as shown in FIG. 3. Thus, there are two bridle lines 16a connected to the column 3 supporting the wind turbine, and one bridle line 16a connected to each of the two empty columns 2.

The third mooring line 15b is connected to the wind turbine installation 1 via a further bridle 17. The bridle 17 comprises two bridle lines 17a. Each of the bridle lines 17a is connected to one of the two empty columns 2, such that one bridle line 17a is connected to each empty column 2.

As can be seen in FIG. 3, the bridle lines 17a, which are connected to the empty columns 2, are longer than the bridle lines 16a, two of which are connected to the column 3 supporting the wind turbine. As such, the mooring system of FIG. 3 is rotationally asymmetric about a centre of the wind turbine installation 1.

The bridle radius of the long bridle 17 is three times the bridle radius of the short bridles 16. More specifically, the bridle radius of the long bridle 17 is around 237 m, and the bridle radius of the short bridles 16 is around 79 m. The bridle lines 16a of the short bridles 16 are around 64 m, and the bridle lines 17a of the long bridle 17 are around 213 m.

In other embodiments, the bridle radius of short bridles could be in the range of 50-250 m, and the bridle radius of long bridles could be in the range of 100-500 m. However, the end of the any bridle (particularly the longest bridles) to which a mooring line is connected should not touch the seabed during any environmental conditions.

This arrangement of mooring lines 15a, 15b and bridles 16, 17 in the mooring system of FIG. 3 means that the mooring system has a lower yaw stiffness when the horizontal part of $F_{thrust}$ is directed towards the centre of gravity of the floater (i.e. in the negative x-direction in FIG. 3) and roll-yaw instability may be a risk. However, the yaw stiffness increases significantly when the wind is coming from ±90° (relative to the orientation of the wind turbine installation 1 in FIG. 3, i.e. from positive or negative y-direction) when roll-yaw instability is not a risk.

Figure 4:
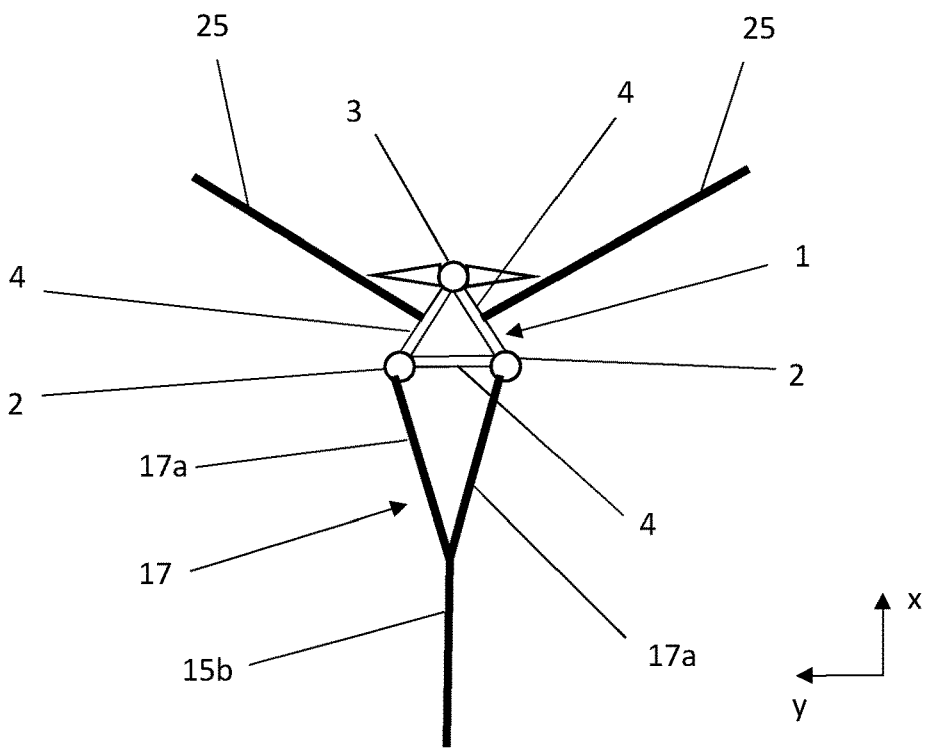
FIG. 4 is a schematic plan view of a floating wind turbine with a mooring system according to a further embodiment.

FIG. 4 is a schematic plan view of a rotationally asymmetric semi-submersible floating wind turbine installation 1 with a mooring system according to a second embodiment.

In the embodiment of FIG. 4, the wind turbine installation is held in position with a mooring system comprising three mooring lines 15b, 25 and one bridle 17, which is connected to the mooring line 15b.

As in the embodiment of FIG. 3, the mooring line 15b is connected to the wind turbine installation 1 via a bridle 17. The bridle 17 comprises two bridle lines 17a. Each of the bridle lines 17a is connected to one of the two empty columns 2, such that one bridle line 17a is connected to each empty column 2.

However, the two further mooring lines 25 are not connected to bridles. Instead, the two further mooring lines 25 are connected directly to mid-points of the two connecting members 4 extending from the column 3 supporting the wind turbine. One mooring line 25 is connected to each connecting member 4 extending from the column 3.

As can be seen in FIG. 4, and since only one bridle 17 is used, the mooring system of FIG. 4 is rotationally asymmetric about a centre of the wind turbine installation 1.

This arrangement of mooring lines 15b, 25 and bridle 17 in the mooring system of FIG. 4 means that the mooring system has a lower yaw stiffness when the horizontal part of $F_{thrust}$ is directed towards the centre of gravity of the floater (i.e. in the negative x-direction in FIG. 4) and roll-yaw instability may be a risk. However, the yaw stiffness increases significantly when the wind is coming from ±90° (relative to the orientation of the wind turbine installation 1 in FIG. 4, i.e. from positive or negative y-direction) when roll-yaw instability is not a risk.

Figure 5:
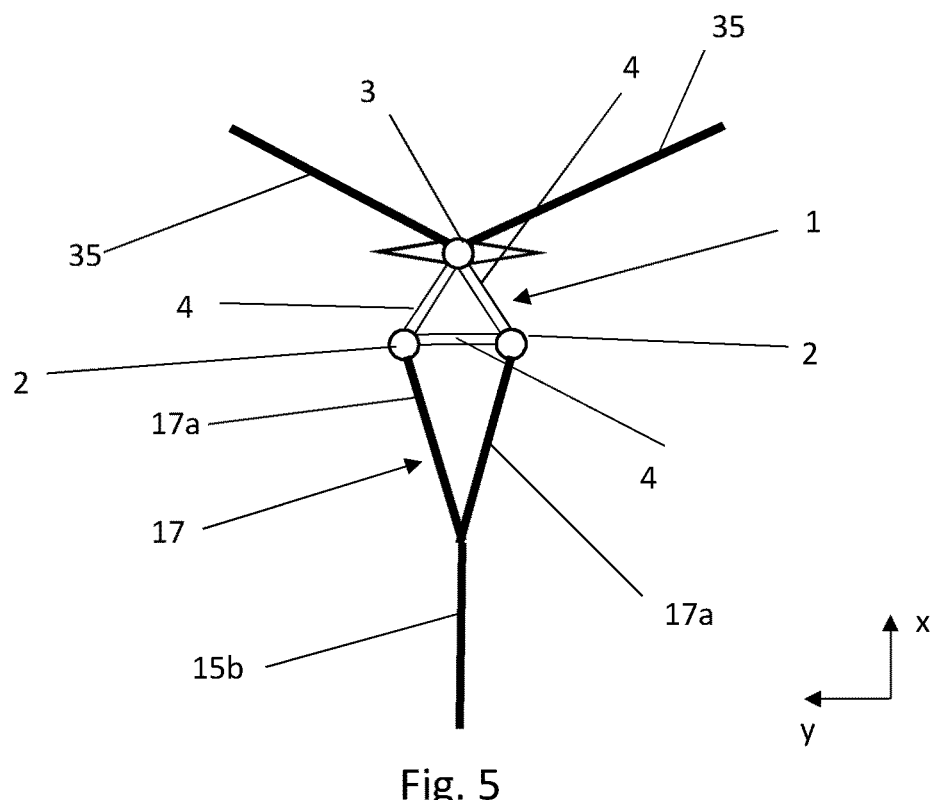
FIG. 5 is a schematic plan view of a floating wind turbine with a mooring system according to yet a further embodiment.
Figure 6:
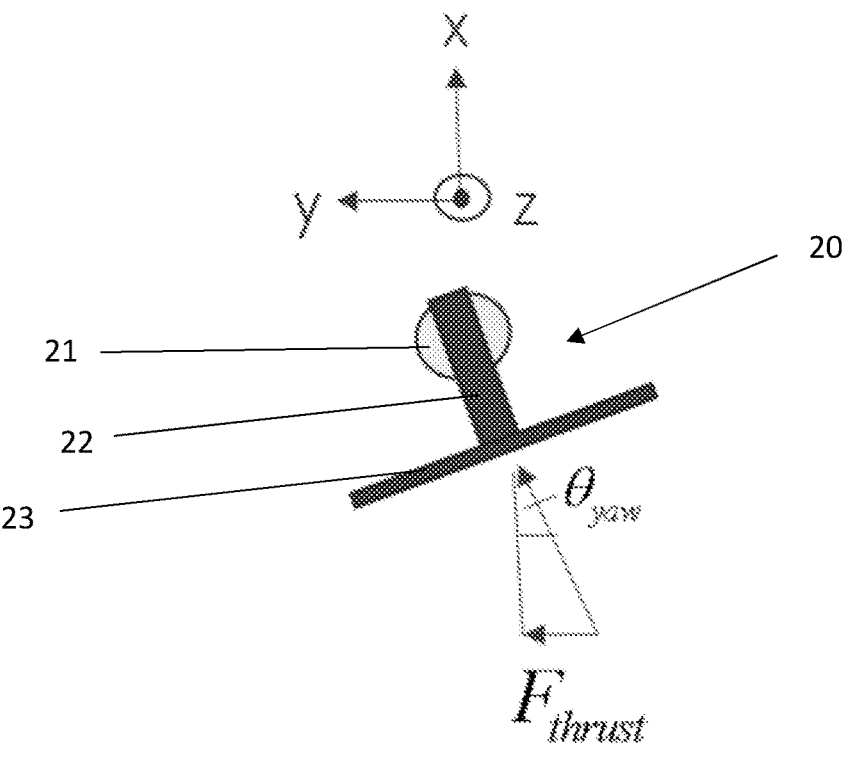
FIG. 6 is a schematic plan view illustrating how yaw motion of a floating wind turbine installation can lead to excitation of a roll moment.
Figure 7:
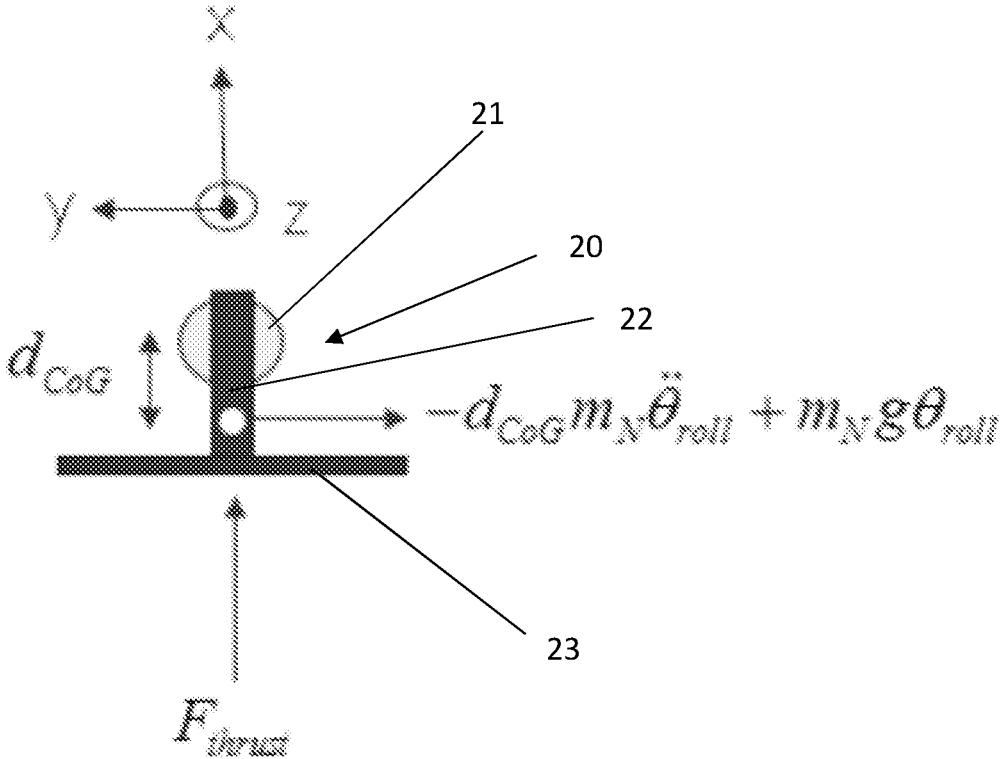
FIG. 7 is a schematic plan view illustrating how roll motion of a floating wind turbine installation can lead to excitation of a yaw moment.
Figure 8:
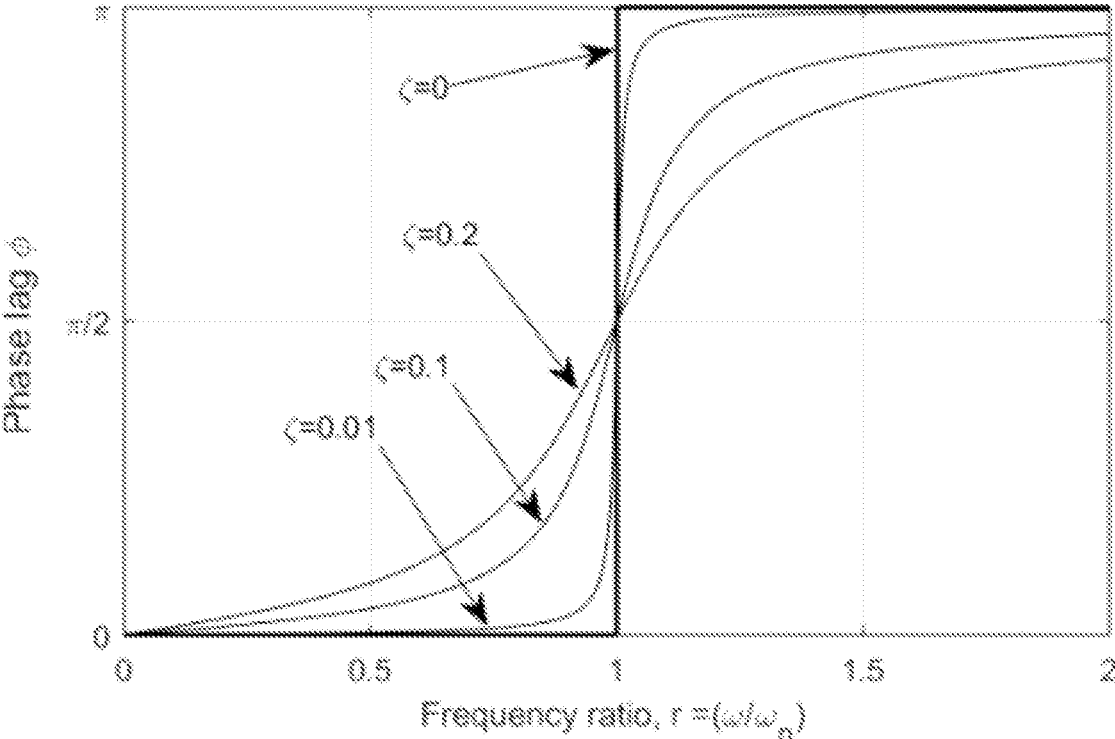
FIG. 8 is a phase diagram for a single degree of freedom dynamic system.

FIG. 5 is a schematic plan view of a rotationally asymmetric semi-submersible floating wind turbine installation 1 with a mooring system according to a third embodiment.

In the embodiment of FIG. 5, the wind turbine installation is held in position with a mooring system comprising three mooring lines 15b, 35 and one bridle 17, which is connected to the mooring line 15b.

As in the embodiments of FIGS. 3 and 4, the mooring line 15b is connected to the wind turbine installation 1 via a bridle 17. The bridle 17 comprises two bridle lines 17a. Each of the bridle lines 17a is connected to one of the two empty columns 2, such that one bridle line 17a is connected to each empty column 2.

However, the two further mooring lines 35 are not connected to bridles. Instead, the two further mooring lines 35 are connected directly to the column 3 supporting the wind turbine.

As can be seen in FIG. 5, and since only one bridle 17 is used, the mooring system of FIG. 5 is rotationally asymmetric about a centre of the wind turbine installation 1.

This arrangement of mooring lines 15b, 35 and bridle 17 in the mooring system of FIG. 5 means that the mooring system has a lower yaw stiffness when the horizontal part of $F_{thrust}$ is directed towards the centre of gravity of the floater (i.e. in the negative x-direction in FIG. 5) and roll-yaw instability may be a risk. However, the yaw stiffness increases significantly when the wind is coming from ±90° (relative to the orientation of the wind turbine installation 1 in FIG. 5, i.e. from positive or negative y-direction) when roll-yaw instability is not a risk.

The bridle and mooring lines 16a, 17a, 15a, 15b, 25, 35 described above may be made of various materials including mooring chain, wire rope, polyester rope, etc. The bridle and mooring lines 16a, 17a, 15a, 15b, 25, 35 may be made of the same materials or different materials.

In some embodiments, the mooring lines 15a, 15b, 25, 35 are formed of a plurality of segments, which may comprise different materials.

The bridle and mooring lines 16a, 17a, 15a, 15b, 25, 35 may have the same or different thicknesses.

The bridle lines 16a, 17a may be connected to the mooring lines 15a, 15b with a joint such as a vacuum-explosion welded transition joint, e.g. Triplate®.

The bridle and/or mooring lines 16a, 17a, 15a, 15b, 25, 35 may be connected to the floating wind turbine installation 1 with a connector such as a fairlead.

Figure 1:
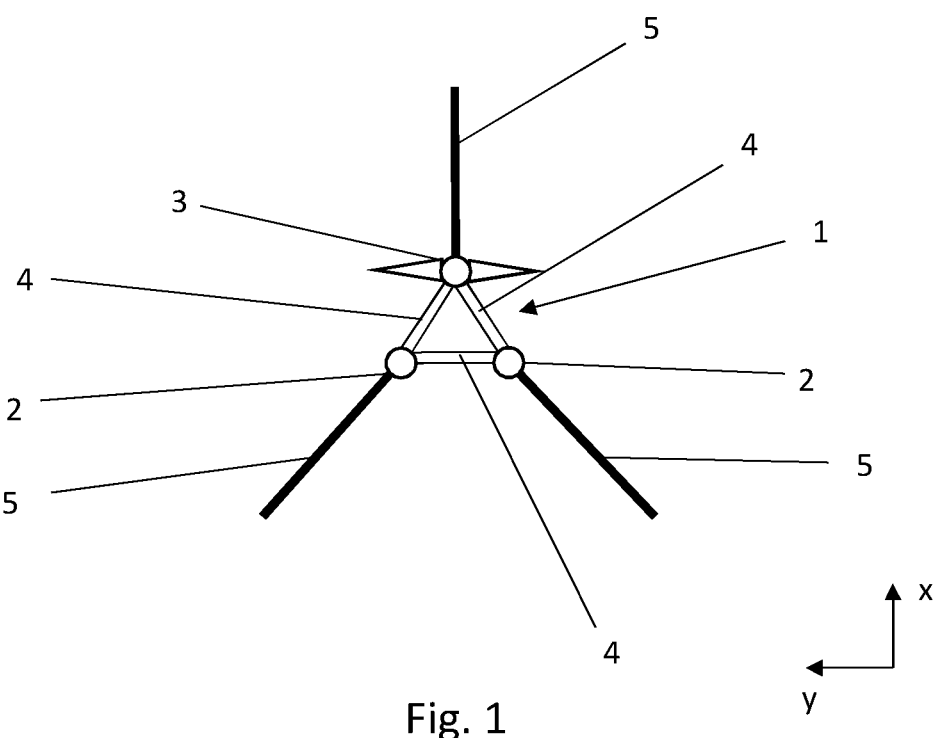
FIG. 1 is a schematic plan view of a floating wind turbine with a known mooring system.
Figure 2:
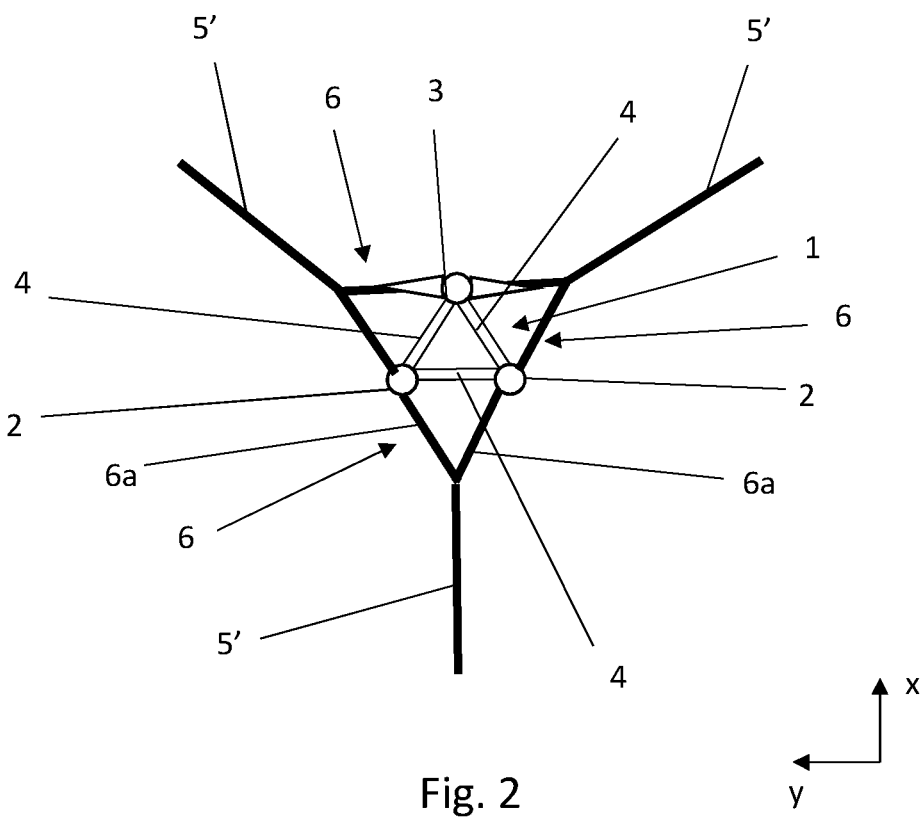
FIG. 2 is a schematic plan view of a floating wind turbine with a further known mooring system.

A comparison of the dynamic response in roll, pitch and yaw motion was made from simulations of the following mooring systems:

A. mooring system with single mooring lines as illustrated in FIG. 1;

B. mooring system with rotationally symmetric mooring system with bridles as illustrated in FIG. 2; and C. mooring system with rotationally asymmetric mooring system with bridles as illustrated in FIG. 3.

System C was simulated to give approximately the same average yaw stiffness as system B in an unloaded condition. Furthermore, the length of the bridles in system C was selected so that the length of the long bridle 17 was three times the length of the short bridles 16.

A load case with a significant wave height of 2.0 m, a characteristic peak period of 7.5 s, and a turbulent wind speed of 11.5 ms$^{-1}$ (turbulence class C) is considered for environment loading coming from 0° (from top or in a negative x direction in FIGS. 1-5) and from 90° (from right or in a positive y direction in FIGS. 1-5).

Figure 9:
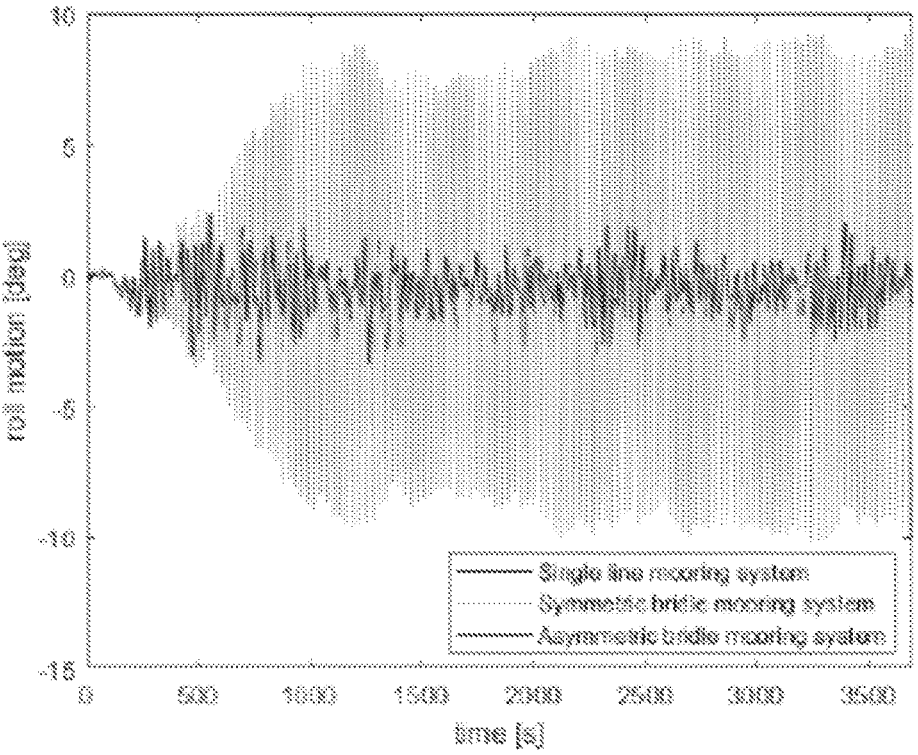
FIG. 9 is a graph showing the roll motion responses for wind turbine installations with different mooring systems when the environment loading is coming from 0°.
Figure 10:
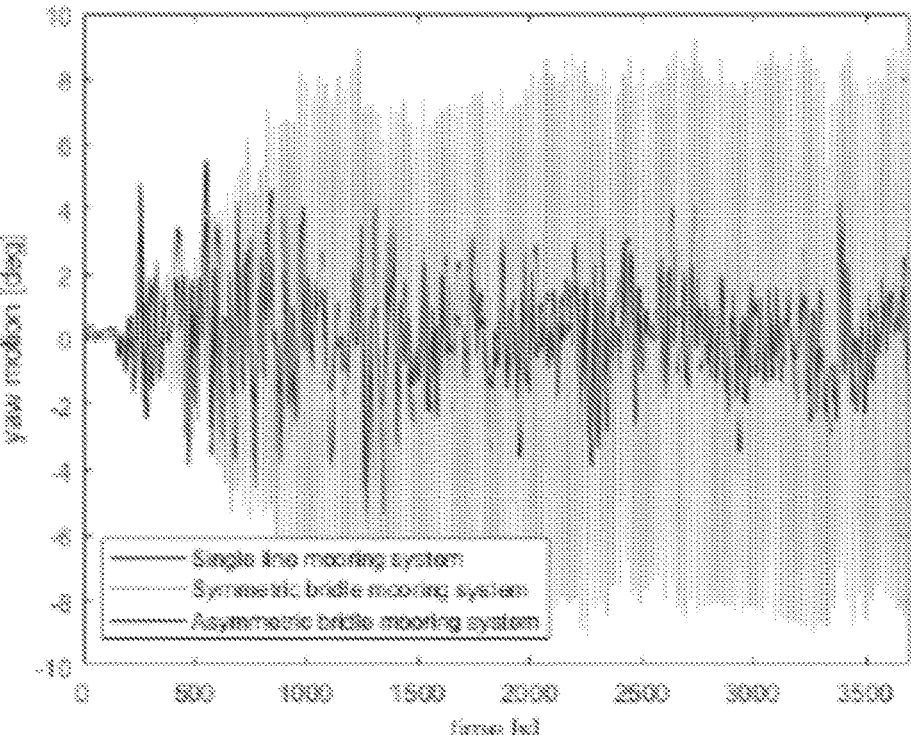
FIG. 10 is a graph showing the yaw motion responses for wind turbine installations with different mooring systems when the environment loading is coming from 0°.

The roll and yaw motion responses for wind turbine installations with the mooring systems A-C above when environmental loading is coming from 0° (i.e. in a negative x direction as indicated in FIGS. 1-5) are shown in FIGS. 9 and 10. From these graphs, it can be seen that:

the rotationally symmetric configuration B becomes dynamically unstable in roll-yaw;

the roll and yaw motion characteristics are stable for both the single line mooring system A and the rotationally asymmetric bridle mooring system C; and the smallest roll and yaw motions are observed for the asymmetric bridle mooring system C.

Figure 11:
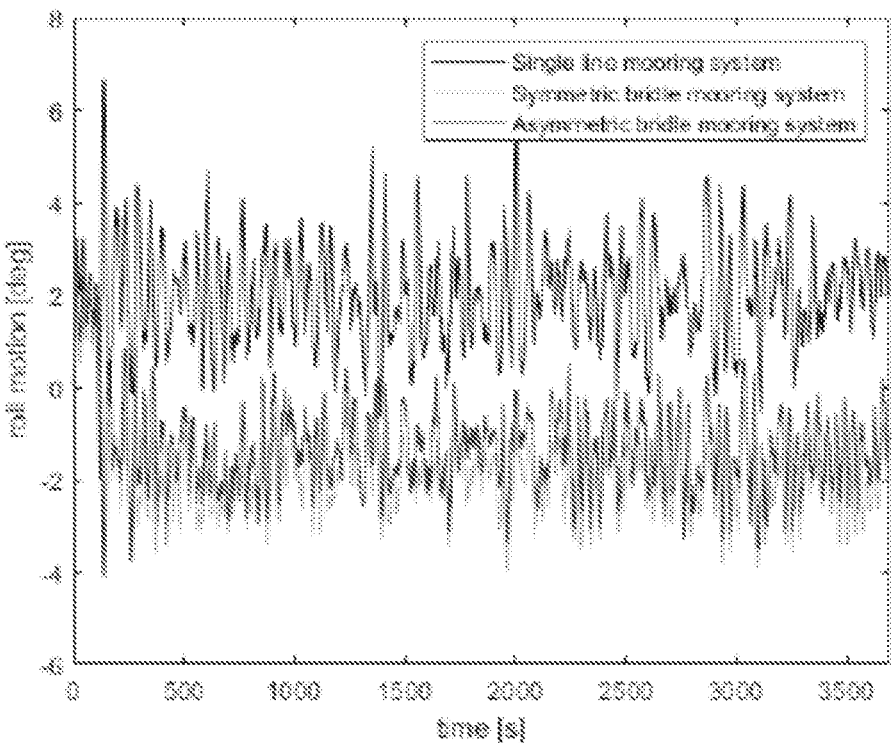
FIG. 11 is a graph showing the roll motion responses for wind turbine installations with different mooring systems when the environment loading is coming from 90°.
Figure 12:
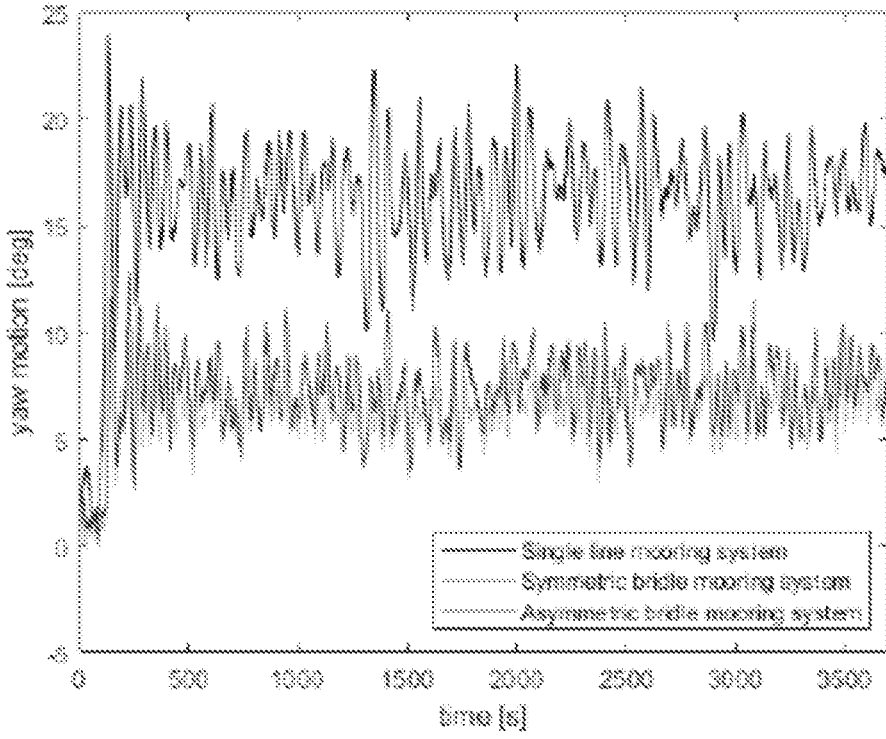
FIG. 12 is a graph showing the yaw motion responses for wind turbine installations with different mooring systems when the environment loading is coming from 90°.

The roll and yaw motion responses for wind turbine installations with the mooring systems A-C above when environmental loading is coming from 90° (i.e. in a negative y direction as indicated in FIGS. 1-5) are shown in FIGS. 11 and 12. From these graphs, it can be seen that:

both a large yaw offset angle (yaw motion) and largest roll and yaw motions are observed for the single line mooring system A; and the yaw offset angle (yaw motion) for the mooring system with rotationally asymmetric bridles C is of the same order of magnitude as the mooring system with rotationally symmetric bridles B.

Figure 13:
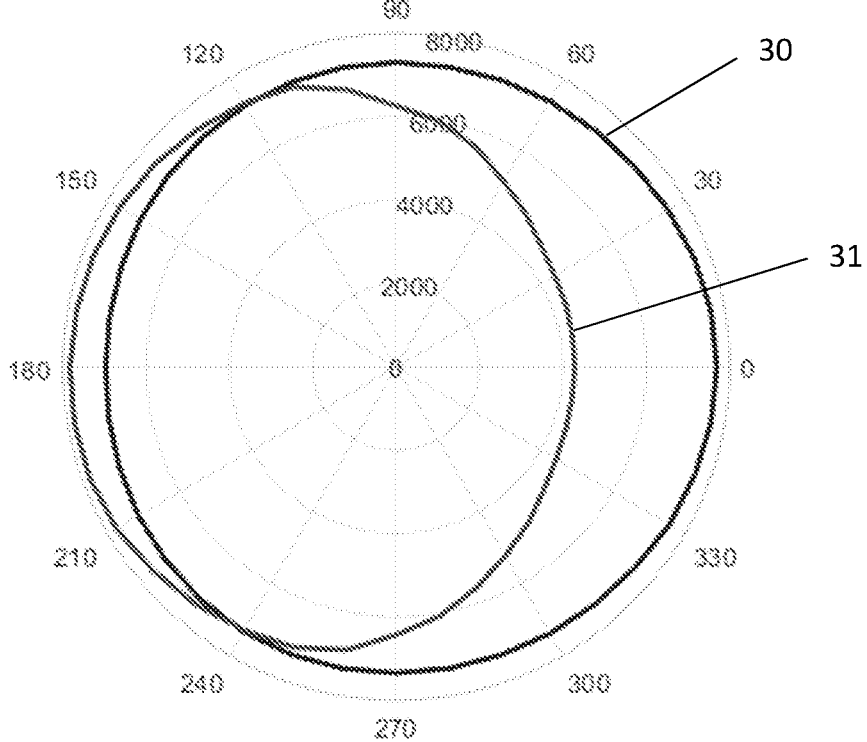
FIG. 13 is a plot of yaw stiffness as a function of polar angle for two different mooring systems.

FIG. 13 is a polar plot of yaw stiffness (in kNm/deg) in a radial direction for a 1700 kN constant force applied at the floater origin from different wind directions, where the wind is coming from 0° to 360°.

The (blue) line 30 shows the yaw stiffness as a function of angle for the rotationally symmetric mooring system of FIG. 2. As can be seen from FIG. 13, the rotationally symmetric mooring system of FIG. 2 has approximately constant yaw stiffness regardless of the wind direction.

The (red) line 31 shows the yaw stiffness as a function of angle for the rotationally asymmetric mooring system of FIG. 3. As can be seen from FIG. 13, the rotationally asymmetric mooring system of FIG. 3 has greater yaw stiffness when the wind is coming from around 90° or 270°, compared to when the wind is coming from 0°.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

I claim:

1. A wind turbine system comprising a rotationally asymmetric floating wind turbine installation and a rotationally asymmetric mooring system connected to the floating wind turbine installation, wherein the mooring system comprises a plurality of mooring lines connected, directly or indirectly, to the floating wind turbine installation such that the mooring system has a lower yaw stiffness when a wind acting on the wind turbine installation comes from 0° than when a wind acting on the wind turbine installation comes from ±90°, wherein a wind coming from 0° is defined as a wind direction when the horizontal part of the aerodynamic rotor thrust force resulting from the wind is directed towards the centre of gravity of the floating wind turbine installation; wherein:

the mooring system comprises at least one first mooring line and at least one second mooring line, each of the at least one first and second mooring lines having a wind turbine installation connection end for connection to the floating wind turbine installation;

the wind turbine installation connection end of the at least one first mooring line is arranged at a location closer to the rotor than the wind turbine installation connection end of the at least one second mooring line; and the wind turbine installation connection end of the at least one second mooring line is located further from the floating wind turbine installation than the wind turbine installation connection end of the at least one first mooring line.

2. A wind turbine system as claimed in claim 1, wherein at least one mooring line is connected to the floating wind turbine installation with a bridle.

3. A wind turbine system as claimed in claim 1, where at least two and optionally all of the plurality of mooring lines are connected to the floating wind turbine installation with bridles.

4. A wind turbine system as claimed in claim 3, wherein the bridles are of at least two different lengths.

5. A wind turbine system as claimed in claim 4, wherein a shorter bridle or bridles of the mooring system is/are connected to the wind turbine installation at a location or locations closer to the rotor than a longer bridle or bridles.

6. A wind turbine system as claimed in claim 1, wherein the wind turbine installation comprises a plurality of columns and at least one bridle is arranged to connect at least one mooring line to one or more of the plurality of columns.

7. A wind turbine system as claimed in claim 1, wherein at least one mooring line is connected directly to a support structure or column of the floating wind turbine installation.

8. A wind turbine system as claimed in claim 7, wherein the column to which at least one mooring line is directly connected is a column supporting a rotor of the wind turbine installation.

9. A wind turbine system as claimed in claim 7, wherein two mooring lines are connected directly to a column or support structure of the floating wind turbine installation.

10. A wind turbine system as claimed in claim 1, wherein the mooring system comprises three mooring lines, at least one of which is attached to the wind turbine installation with a bridle.

11. A wind turbine system as claimed in claim 10, wherein first and second mooring lines of the three mooring lines are arranged closer to the rotor than a third mooring line of the three mooring lines.

12. A wind turbine system as claimed in claim 11, wherein the first and second mooring lines arranged closer to the rotor are directly or indirectly connected to a column of the wind turbine installation supporting the rotor.

13. A wind turbine system as claimed in claim 11, wherein the third mooring line is attached to the wind turbine installation with a bridle.

14. A wind turbine system as claimed in claim 11, wherein wind turbine installation connection ends of the first and second mooring lines are arranged closer to the wind turbine installation than a wind turbine installation connection end of the third mooring line.

15. A method of mooring a rotationally asymmetric wind turbine installation, the method comprising:

providing a rotationally asymmetric mooring system comprising a plurality of mooring lines; and connecting the plurality of mooring lines, directly or indirectly, to the floating wind turbine installation such that the mooring system has a lower yaw stiffness when a wind acting on the wind turbine installation comes from 0° than when a wind acting on the wind turbine installation comes from +90°, wherein a wind coming from 0° is defined as a wind direction when the horizontal part of the aerodynamic rotor thrust force resulting from the wind is directed towards the centre of gravity of the floating wind turbine installation; wherein:

the mooring system comprises at least one first mooring line and at least one second mooring line, each of the at least one first and second mooring lines having a wind turbine installation connection end for connection to the floating wind turbine installation;

the wind turbine installation connection end of the at least one first mooring line is arranged at a location closer to the rotor than the wind turbine installation connection end of the at least one second mooring line; and the wind turbine installation connection end of the at least one second mooring line is located further from the floating wind turbine installation than the wind turbine installation connection end of the at least one first mooring line.

16. A method as claimed in claim 15, wherein the wind turbine installation and mooring system form a wind turbine system as claimed in claim 1.

\* \* \* \* \*